US011992854B2

(12) United States Patent
Kim

(10) Patent No.: US 11,992,854 B2
(45) Date of Patent: May 28, 2024

(54) AIR MIXING NOZZLE TIP STRUCTURE

(71) Applicant: INUS CO., LTD., Asan-si (KR)

(72) Inventor: Myung Hwan Kim, Suwon-si (KR)

(73) Assignee: INUS CO., LTD., Asan-si (KR)

( * ) Notice: Subject to any disclaimer, the term of this patent is extended or adjusted under 35 U.S.C. 154(b) by 0 days.

(21) Appl. No.: 17/637,526

(22) PCT Filed: Sep. 27, 2021

(86) PCT No.: PCT/KR2021/013091
§ 371 (c)(1),
(2) Date: Feb. 23, 2022

(87) PCT Pub. No.: WO2022/108089
PCT Pub. Date: May 27, 2022

(65) Prior Publication Data

US 2024/0050967 A1 Feb. 15, 2024

(30) Foreign Application Priority Data

Nov. 18, 2020 (KR) ........................ 10-2020-0154514

(51) Int. Cl.
*B05B 7/04* (2006.01)
*B05B 7/08* (2006.01)
*E03D 9/08* (2006.01)

(52) U.S. Cl.
CPC .......... *B05B 7/0425* (2013.01); *B05B 7/0876* (2013.01); *E03D 9/08* (2013.01)

(58) Field of Classification Search
CPC ............................ B05B 7/0876; B05B 7/0425
USPC .............................................................. 4/445
See application file for complete search history.

(56) References Cited

U.S. PATENT DOCUMENTS

2012/0304371 A1* 12/2012 Duvencioglu ............ E03D 9/08 4/448

FOREIGN PATENT DOCUMENTS

KR 10-1498238 B1 3/2015

* cited by examiner

*Primary Examiner* — Lauren A Crane
(74) *Attorney, Agent, or Firm* — GOLDILOCKS ZONE IP LAW

(57) ABSTRACT

Proposed is an air mixing nozzle tip structure which improves productivity while simplifying the structure by being configured so that air is introduced through an air mixing inlet and discharged together with wash water, improves cleaning power while realizing a massage effect because fine water droplets are formed in the process that wash water and air are combined and discharged, controls the inlet amount of air by forming the air mixing inlet on one side or each of opposite sides of a nozzle tip cover or by adjusting the cross-sectional size of the air mixing inlet, and promotes product stability by providing an air supply passage at the rear of the air mixing inlet so that the air introduced through the air mixing inlet is smoothly discharged to a wash water ejection hole through an air guide.

1 Claim, 7 Drawing Sheets

(a)

(b)

AIR MIXING NOZZLE TIP STRUCTURE

CROSS-REFERENCE TO RELATED APPLICATIONS

This application claims the benefit under 35 U.S.C. section 371, of PCT International Application No. PCT/KR2021/013091, filed on Sep. 27, 2021, which claims foreign priority to Korean Patent Application No. 10-2020-0154514, filed on Nov. 18, 2020, in the Korean Intellectual Property Office, both of which are hereby incorporated by reference in their entireties.

TECHNICAL FIELD

The present disclosure relates to an air mixing nozzle tip structure and, more particularly, to an air mixing nozzle tip structure which improves productivity while simplifying the structure by being configured so that air is introduced through an air mixing inlet and discharged together with wash water, realizes a massage effect because fine water droplets are formed in the process that wash water and air are combined and discharged, controls the inlet amount of air by forming the air mixing inlet on one side or each of opposite sides of a nozzle tip cover or by adjusting the cross-sectional size of the air mixing inlet, and provides an air supply passage at the rear of the air mixing inlet so that the air introduced through the air mixing inlet is smoothly discharged to a wash water ejection hole through an air guide.

BACKGROUND ART

In general, a bidet is a device designed to clean one's anus, genitalia, and perineum after defecation or urination with wash water that maintains the set temperature according to a button control of a user and is sprayed from a spray nozzle, and to dry out remaining water around the washed anus and genitals with warm air. Bidets are widely used in homes, offices, schools, lodging facilities, rest areas, and public toilets.

In the bidet nozzle as above, a wash water pipe, which mounted on the lower part of the bidet and in which wash water, bidet water, and easy-defecation water moving holes are formed therethrough, moves forward by the water pressure of the wash water, and at the end of the wash water pipe, an upper cap through which wash water, bidet water, and easy-defecation water ejection holes are formed to communicate with the wash water, bidet water, and easy-defecation water moving holes, respectively, is combined so as to wash the user's genital or anal region.

Such bidet nozzle has a problem in that a considerable amount of wash water (700 cc~1000 cc) is required because the wash water is continuously discharged through the wash water ejection hole to clean, thus the wash water is needlessly wasted and economic efficiency decreases. Further, considering the amount of wash water required, cleaning power is inadequate.

Recently, there is also a method of providing air to the wash water by equipping a bidet nozzle with an air pump to boost the cleaning power of the wash water to facilitate bowel movements. However, such bidet nozzle requires additional manufacturing and assembly of separate dedicated parts, so the structure of the bidet nozzle becomes more complex and at the same time, the manufacturing cost rises and the productivity of the product falls remarkably, which is uneconomical.

Regarding the bidet nozzle, the nozzle tip structure of the bidet has been registered as Korean Patent Notification No. 10-1498238.

This pre-registered invention is configured to have a protrusion that protrudes from the nozzle tip and forms a discharge hole therein, a through hole passing through with a diameter smaller than the diameter of the discharge hole, and an air hole that communicates with the discharge hole and passes through so that air moves into the discharge hole.

In the case of the pre-registered invention, the cleaning power may be improved since air flows in through the air hole and is sprayed together with the wash water when the wash water is ejected through the discharge hole. However, the problem is that a certain amount of wash water continuously ejected causes pain and it is uneconomical as well because wash water is wasted unnecessarily.

DISCLOSURE

Technical Problem

Accordingly, the present disclosure is proposed to solve the above-described problems and an objective of the present disclosure is to provide an air mixing nozzle tip structure which can improve productivity while simplifying the structure by being configured so that air is introduced through an air mixing inlet and discharged together with wash water, and can improve cleaning power while realizing a massage effect because fine water droplets are formed in the process that wash water and air are combined and discharged.

Another objective of the present disclosure is to provide an air mixing nozzle tip structure which can control the inlet amount of air by forming the air mixing inlet on one side or each of opposite sides of a nozzle tip cover or by adjusting the cross-sectional size of the air mixing inlet.

Yet another objective of the present disclosure is to provide an air mixing nozzle tip structure which promotes product stability by providing an air supply passage at the rear of the air mixing inlet so that the air introduced through the air mixing inlet is smoothly discharged to a wash water ejection hole through an air guide.

Technical Solution

According to an embodiment of the present disclosure for achieving the objective as described above, provided is an air mixing nozzle tip structure, including: a nozzle tip body in which a wash water moving hole and a bidet water moving hole for movement of wash water and bidet water are formed therethrough, and coupled to a nozzle main body; and a nozzle tip cover welded to an upper part of the nozzle tip body, the nozzle tip cover having a wash water ejection hole and a bidet water ejection hole that are formed to communicate with the wash water moving hole and the bidet water moving hole, respectively, so that the wash water and the bidet water are sprayed, the nozzle tip structure further including: an air mixing inlet formed in the nozzle tip cover, communicating with the wash water ejection hole to introduce external air; an air guide formed to be protruded on an upper portion of the nozzle tip body, adjacent to the wash water moving hole, and allowing the air introduced through the air mixing inlet to be ejected together with the wash water through the wash water ejection hole; and an air supply passage formed to extend backward inside the nozzle tip cover from the air mixing inlet and facilitating an inflow of air to the air guide.

The air mixing inlet may be formed on one side or each of opposite sides of the nozzle tip cover to control an inlet amount of air.

The air guide may be formed in a circular shape along an edge of the wash water moving hole, with a guide surface being formed on the outer surface thereof in the direction toward the air supply passage to be inclined at a predetermined angle to guide the inflow of air.

The air guide may control the inlet amount of air according to the angle of the guide surface.

The air guide may be located inside the wash water ejection hole to prevent the wash water from flowing into the air mixing inlet and blocking the air supply passage.

A wing part extending in the width direction of the nozzle tip body may be formed on each side of the air guide, and coupling grooves may be formed on the inside of the nozzle tip cover to correspond to the wing parts, keeping the optimal air inflow path when the nozzle tip body and the nozzle tip cover are welded.

Advantageous Effects

As described above, the air mixing nozzle tip structure according to the embodiment of the present disclosure has an effect of not only improving productivity while simplifying the structure by being configured so that air is introduced through the air mixing inlet and discharged together with wash water, but also improving cleaning power while realizing a massage effect because fine water droplets are formed in the process that wash water and air are combined and discharged.

In addition, the air mixing nozzle tip structure according to the embodiment of the present disclosure has an effect of controlling the inlet amount of air by forming the air mixing inlet on one side or both sides of the nozzle tip cover.

Further, the air mixing nozzle tip structure according to the embodiment of the present disclosure has an effect of promoting product stability by providing the air supply passage at the rear of the air mixing inlet so that the air introduced through the air mixing inlet is smoothly discharged to the wash water ejection hole through the air guide.

MODE FOR INVENTION

Figure 1:
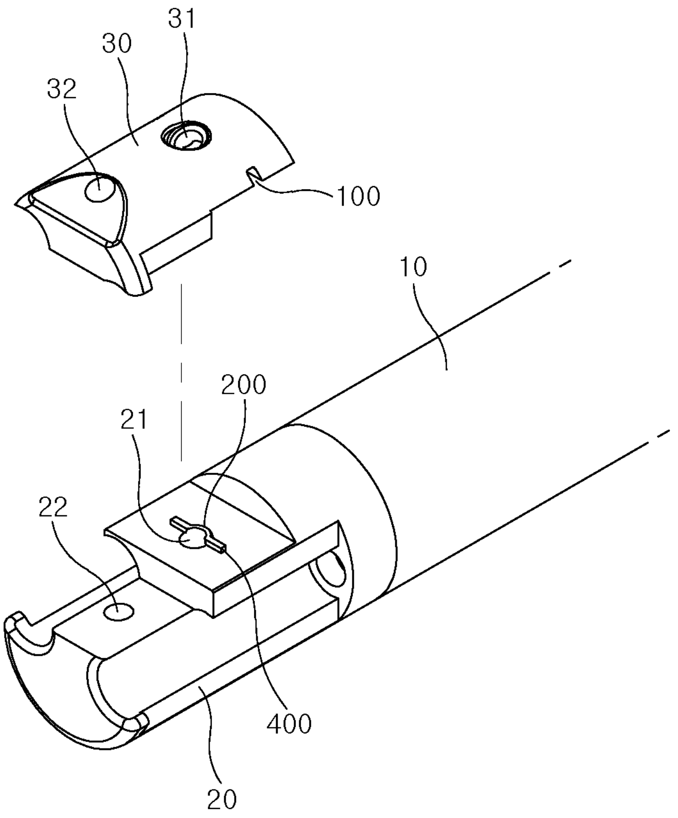
FIG. 1 is an exploded perspective view of the present disclosure.
Figure 2:
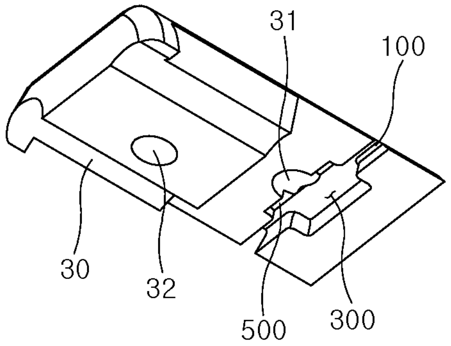
FIG. 2 is a bottom perspective view of the nozzle tip cover to which the present disclosure is applied.
Figure 3:
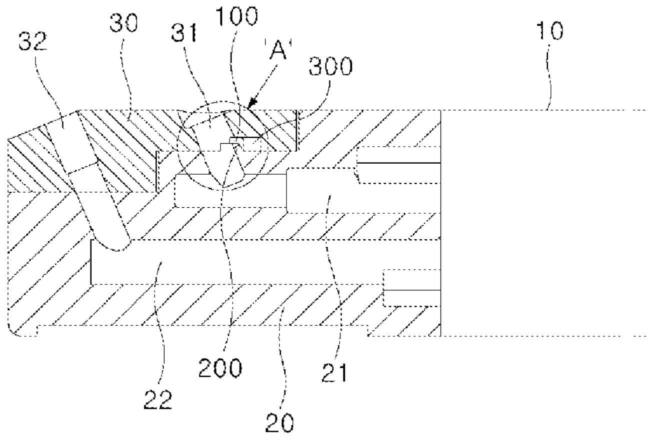
FIG. 3 is a side cross-sectional view of the present disclosure.

Hereinafter, the present disclosure will be described in detail based on the accompanying drawings. FIG. 1 is an exploded perspective view of the present disclosure, FIG. 2 is a bottom perspective view of the nozzle tip cover to which the present disclosure is applied, and FIG. 3 is a side cross-sectional view of the present disclosure.

To begin with, in a nozzle main body 10 which serves to clean the anus or genitals, a nozzle tip for emanating wash water is fixed, and the structure of the nozzle tip as above includes a nozzle tip body 20 and a nozzle tip cover 30.

Typically, the nozzle tip body 20 that is coupled to the nozzle main body 10 has a wash water moving hole 21 and a bidet water moving hole 22 formed therein, and the nozzle tip cover 30 has a wash water ejection hole 31 and a bidet water ejection hole 32 formed therein to communicate with the wash water moving hole 21 and the bidet water moving hole 22, respectively.

An air mixing nozzle tip structure of the present disclosure consists of an air mixing inlet 100, an air guide 200, and an air supply passage 300.

The air mixing inlet 100 is formed in the nozzle tip cover 30 so that external air is introduced in.

The air mixing inlet 100 is selectively formed on one side or each of opposite sides of the nozzle tip cover 30 to control the inlet amount of air. The inlet amount of air may also be controlled by adjusting the cross-sectional size of the air mixing inlet 100.

The air guide 200 is formed on an upper portion of the nozzle tip body 20, and is formed to be protruded so as to be adjacent to the rear of the wash water moving hole 21 formed in the nozzle tip body 20.

The air guide 200 is formed in a circular shape along the edge of the wash water moving hole 21, and on an outer surface thereof, a guide surface 210 is formed in the direction toward the air supply passage 300 to be inclined at a predetermined angle to guide the inflow of air.

The inlet amount of air may be controlled according to the angle of the guide surface 210. For example, when the angle of the guide surface 210 is gently formed with respect to the bottom surface of the air mixing inlet 100, the inlet amount of air increases, whereas when the angle of the guide surface 210 is sharply formed, the inlet amount of air decreases.

Also, the air guide 200 may be located inside the wash water ejection hole 31 to prevent the wash water from flowing into the air mixing inlet 100 and blocking the air supply passage 300.

When the air guide 200 is formed in the middle of the wash water ejection hole 31 and the air mixing inlet 100, wash water cannot be ejected together with air and escapes through the air mixing inlet 100. Thus, it is preferable that the air guide 200 is located inside the wash water ejection hole 31 of the nozzle tip cover 30.

Figure 4:
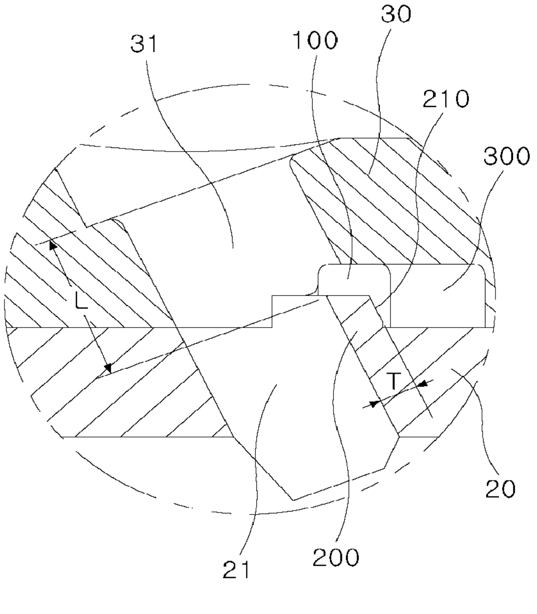
FIG. 4 is an enlarged cross-sectional view of part 'A' of FIG. 3

As shown in FIG. 4, a distance L between an upper surface of the air guide 200 and a final water outlet surface of the wash water ejection hole 31 should be at least 2 mm, otherwise, irregularity of the inflow of air occurs. The thickness T of the air guide 200 should be 0.2 mm or more to prevent shape deformation of the air guide 200, otherwise, there may arise a problem in durability when the air guide 200 is molded and the shape of the air guide 200 may be deformed during long-term use.

The air supply passage 300 is formed extending from the air mixing inlet 100 to the rear of the nozzle body 10 side on the inside the nozzle tip cover 30.

The air supply passage 300 is formed with a larger cross-sectional area than the air mixing inlet 100 to increase an inflow speed of the air introduced into the air mixing inlet 100 and to play a role of smoothly supplying the air introduced into the air mixing inlet 100 to the air guide 200.

When the air supply passage 300 is not formed, as the air introduced into the air mixing inlet 100 is not smoothly supplied to the air guide 200, a part of the wash water ejected to the wash water ejection hole 31 may exit to the air mixing inlet 100 side. The air supply passage 300 may prevent this kind of incident from occurring.

A wing part 400 extending in the width direction of the nozzle tip body 20 is formed on each side of the air guide 200 to keep the optimal air inflow path when the nozzle tip body 20 and the nozzle tip cover 30 are welded. Also, coupling grooves 500 are formed on the inside of the nozzle tip cover 30 to correspond to the wing parts 400, and when the nozzle tip body 20 and the nozzle tip cover 30 are fixed, the wing parts 400 are coupled to the coupling grooves 500.

In the absence of the wing parts 400 and the coupling grooves 500 when the nozzle tip body 20 and the nozzle tip cover 30 are fixed as above, the air inflow path does not match correctly, causing irregularity problems in the inflow of air. Therefore, it is absolutely necessary to have a member that plays a central role, such as the wing part 400 and the coupling groove 500, that can match the optimal air inflow path.

Figure 7:
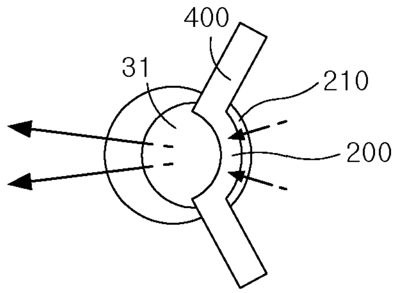
FIG. 7 shows controlling of inlet amount of air according to the present disclosure.
Figure 7:
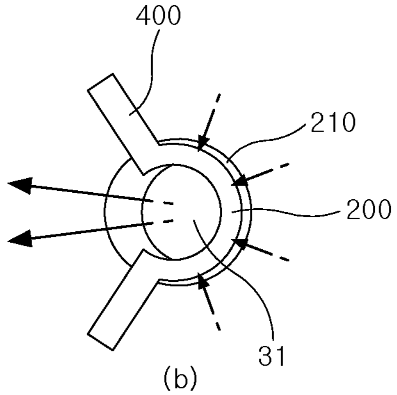

In addition, as shown in (A), (B) of FIG. 7, the inlet amount of air may be controlled by bending the angle of the wing part 400 toward the nozzle main body 10 or bending toward the tip of the nozzle tip cover 30. When the wing part 400 is formed toward the nozzle main body 10, the air guide 200 is narrowed and the inlet amount of air is reduced, whereas when the wing part 400 is formed toward the tip of the nozzle tip cover 30, as the portion of the air guide 200 increases, the inlet amount of air is also increased.

The following describes in detail the state of use of the air mixing nozzle tip structure of the present disclosure.

Figure 5:
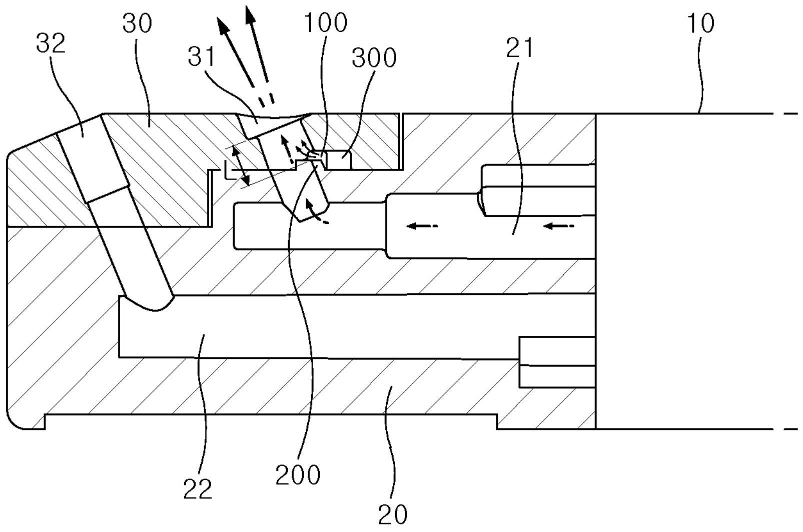
FIGS. 5 and 6 are diagrams of a state of use of the present disclosure.
Figure 6:
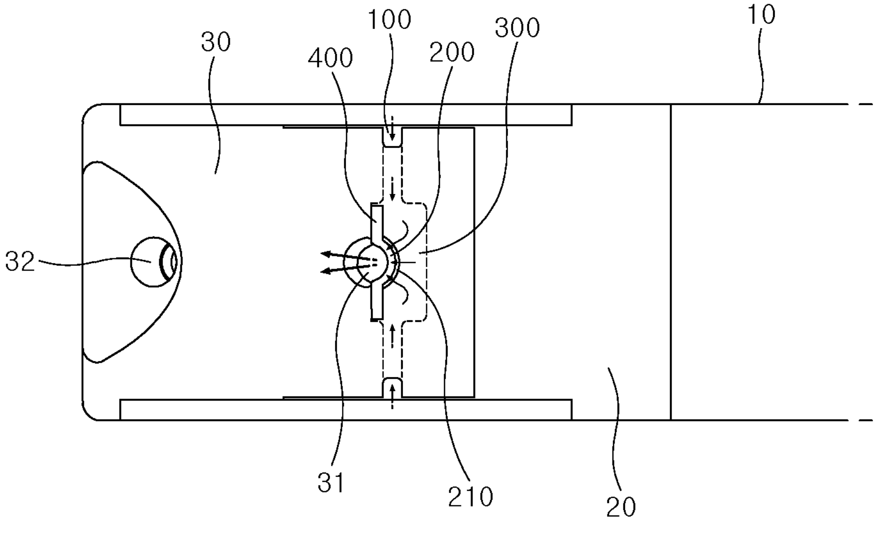

As shown in FIGS. 5 and 6, when a user presses the corresponding button on a controller after defecation, the wash water passes through the nozzle main body 10 and is supplied to the wash water moving hole 21, and simultaneously, a water jet stream ejected from the wash water ejection hole 31 of the nozzle tip cover 30 cleans the user's anal region.

At this time, external air is introduced through the air mixing inlet 100 formed in the nozzle tip cover 30, and the air introduced is flowed into the air supply passage 300.

As for the air introduced into the air supply passage 300, since the space of the air supply passage 300 is wider than that of the air mixing inlet 100, the external air is quickly flowed in and the air introduced is guided along the guide surface 210 formed in the air guide 200, and joins with the wash water ejected from the wash water ejection hole 31 to generate fine water droplets, making the stream of water gentle.

When the wash water with fine water droplets is sprayed around the user's anal region, the user does not feel any pain, which gives satisfaction to the user.

The wash water in which fine water droplets are generated as described above is discharged around the user's anal region through the wash water ejection hole 31. In this case, not only can the effect of massaging the user's buttocks be realized due to the fine water droplets contained in the wash water, but also the effect of soft hitting be created, resulting in clean cleansing without irritation of the anus.

As described above, although the present disclosure has been described with reference to limited embodiments and drawings, terms or words used in this specification and claims should not be construed as being limited to conventional or dictionary meanings and should be interpreted in the meaning and concept consistent with the technical idea of the present disclosure.

Therefore, the configuration shown in the embodiments and drawings described in this specification is only one embodiment of the present disclosure, and does not represents all of the technical spirit of the present disclosure, thus, it should be understood that various equivalents and modifications may be made without departing from the scope of the claims of the present disclosure.

The invention claimed is:

1. An air mixing nozzle tip structure, comprising: a nozzle tip body in which a wash water moving hole and a bidet water moving hole for movement of wash water and bidet water are formed therethrough, and coupled to a nozzle main body; and a nozzle tip cover welded to an upper part of the nozzle tip body, the nozzle tip cover having a wash water ejection hole and a bidet water ejection hole that are formed to communicate with the wash water moving hole and the bidet water moving hole, respectively, so that the wash water and the bidet water are sprayed, the nozzle tip structure further comprising:

an air mixing inlet formed in the nozzle tip cover, communicating with the wash water ejection hole to introduce external air is mixed;

an air guide formed to be protruded on an upper portion of the nozzle tip body, adjacent to the wash water moving hole, and allowing the air introduced through the air mixing inlet to be ejected together with the wash water through the wash water ejection hole; and an air supply passage formed to extend backward inside the nozzle tip cover from the air mixing inlet and facilitating an inflow of air to the air guide, wherein the air mixing inlet is formed on one side or each of opposite sides of the nozzle tip cover to control an inlet amount of air, the air guide is formed in a circular shape along an edge of the wash water moving hole, with a guide surface being formed on an outer surface thereof in a direction toward the air supply passage to be inclined at a predetermined angle to guide the inflow of air, and to control the inlet amount of air according to the angle of the guide surface, wherein the air guide is located inside the wash water ejection hole to prevent the wash water from flowing into the air mixing inlet and blocking the air supply passage, a distance between an upper surface of the air guide and a final water outlet surface of the wash water ejection hole is secured at least 2 mm to prevent irregularity of the inflow of air, and a wing part extending in a width direction of the nozzle tip body is formed on each side of the air guide, and coupling grooves are formed on the inside of the nozzle tip cover to correspond to the wing part, and the air supply passage is formed with a larger cross-sectional area than the air mixing inlet to increase an inflow speed of the air introduced into the air mixing inlet.

* * * * *